United States Patent
Grell et al.

(10) Patent No.: US 8,585,157 B2
(45) Date of Patent: Nov. 19, 2013

(54) METHOD AND DEVICE FOR THE REPRODUCIBLE GENERATION OF A SPECIFIABLE FINAL PRESSURE IN A BRAKING SYSTEM

(75) Inventors: Philipp Grell, Bietigheim-Bissingen (DE); Ulrich Mahlenbrey, Asperg (DE); Mark Unbescheiden, Markgroeningen (DE); Heiner Messner, Markgroeningen (DE); Raphael Oliveira, Untergruppenbach (DE); Julien Bregeault, Ludwigsburg (DE); Carsten Bodmann, Ludwigsburg (DE); Jens Kolarsky, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 737 days.

(21) Appl. No.: 12/086,669

(22) PCT Filed: Nov. 22, 2006

(86) PCT No.: PCT/EP2006/068755
§ 371 (c)(1),
(2), (4) Date: Sep. 15, 2010

(87) PCT Pub. No.: WO2007/068558
PCT Pub. Date: Jun. 21, 2007

(65) Prior Publication Data
US 2011/0001351 A1    Jan. 6, 2011

(30) Foreign Application Priority Data
Dec. 16, 2005  (DE) .......................... 10 2005 060 321

(51) Int. Cl.
*B60T 8/36* (2006.01)

(52) U.S. Cl.
USPC ...................................... 303/119.2; 303/116.1

(58) Field of Classification Search
USPC ............... 303/116.2, 3, 11, 20, 115.2, 119.1, 303/119.2, 138, 155; 701/70, 71
See application file for complete search history.

(56) References Cited

U.S. PATENT DOCUMENTS

| 5,261,731 | A | * | 11/1993 | Yogo et al. ................. 303/116.1 |
| 6,174,033 | B1 | * | 1/2001 | Busch et al. ................... 303/10 |
| 6,422,622 | B1 | | 7/2002 | Bernard |
| 6,464,307 | B1 | * | 10/2002 | Yoshino .......................... 303/11 |
| 6,582,034 | B2 | * | 6/2003 | Hara et al. ..................... 303/157 |

(Continued)

FOREIGN PATENT DOCUMENTS

| DE | 195 27 705 | 1/1997 |
| DE | 195 46 682 | 6/1997 |
| DE | 195 48 248 | 6/1997 |
| DE | 198 20 884 | 11/1999 |

(Continued)

*Primary Examiner* — Robert A Siconolfi
*Assistant Examiner* — Stephen Bowes
(74) *Attorney, Agent, or Firm* — Kenyon & Kenyon LLP

(57) ABSTRACT

To achieve a specifiable, and thus reproducible final pressure in at least one part of the brake circuit, the pump is first actuated for pressure buildup or pressure reduction when the valve is closed. When a first specified setpoint pressure is reached, or when a pressure threshold value is exceeded, the valve is put into an open position using a first actuation. After the pump is switched off, the actuation of the valve is modified in such a way that, during a specifiable time, a continuous change of the first actuation is undertaken all the way up to a second actuation, in which the valve assumes a holding position, particularly while taking into consideration the pressure difference which prevails at the valve.

6 Claims, 4 Drawing Sheets

(56) References Cited

U.S. PATENT DOCUMENTS

| | | |
|---|---|---|
| 6,950,738 B2 * | 9/2005 | Inagaki et al. .................. 701/71 |
| 2005/0001481 A1 * | 1/2005 | Kley et al. .................... 303/191 |
| 2005/0275286 A1 * | 12/2005 | Ohmori et al. ................ 303/155 |

FOREIGN PATENT DOCUMENTS

| | | |
|---|---|---|
| EP | 0 982 208 | 3/2000 |
| JP | 2001-55127 | 2/2001 |
| WO | 00/02753 | 1/2000 |

* cited by examiner

METHOD AND DEVICE FOR THE REPRODUCIBLE GENERATION OF A SPECIFIABLE FINAL PRESSURE IN A BRAKING SYSTEM

FIELD OF THE INVENTION

The present invention relates to a method and a device for controlling a hydraulic or pneumatic braking system.

BACKGROUND INFORMATION

Hydraulic braking systems for motor vehicles are known in many different variations. Such a braking system has at least one brake circuit in which at least one arrangement that conveys the pressure medium, a pump, in particular, is situated which is also designated as a return pump. In addition, at least one further arrangement for conveying the pressure medium may optionally be provided, especially a self-priming charge pump, which is connected via a suction line to a storage container for the pressure medium. The inlet and outlet of the pressure medium into the brake circuit is controlled, just as is the inlet and outlet of the pressure medium into the respective wheel brake cylinder, via cutoff devices for the inlet and/or the outlet and/or the passage of the pressure medium, particularly via valves. This is discussed in DE 195 46 682 A1, for example. In an electrohydraulic braking system, such as the one in DE 195 48 248 A1, one also finds this arrangement in principle, in which the pressure medium is supplied to valves or comes from valves by a pump via an interposed pressure reservoir. In this context, the pressure medium is introduced into the wheel brake cylinder or let out from it by opening and closing the inlet and outlet valves according to the braking command of the driver and/or the activating signals of a mediating logic, such as an antilock system, a traction control system or an electronic stability program.

With that, the described arrangement in principle applies in the same way, for instance, in a hydraulic braking system by a return pump having inlet and outlet valves or a charge pump having charge valves or switchover valves, and also as, for instance, in an electrohydraulic braking system by a turbine pump having inlet and outlet valves.

In the case of an unregulated pump actuation, in response to a pressure buildup or a pressure drop, in an emergency, there may be a noise development and/or vibrations which may have a disturbing effect in the passenger compartment. For this purpose, it may be provided that the pump is shut off after a pressure buildup or a pressure drop has taken place. However, in such a design approach it is a disadvantage that the final pressure created in the brake circuit, in this context, is not reproducible after the pump is shut off. The reason for this, among other things, is that the slowing down of the pump varies, based on different boundary conditions, such as the load, the friction, the rotary speed, the wear or the temperature that occur, and consequently supplies differently sized contributions to the final pressure. In addition, however, the switching performance of the valves present in the brake circuit is normally not clearly specifiable, since each valve has tolerances within certain limits based on the pressure present at it.

SUMMARY OF THE INVENTION

Consequently, an object of the exemplary embodiments and/or exemplary methods of the present invention is to achieve a reproducible final pressure by controlling at least one switchover valve.

The exemplary embodiments and/or exemplary methods of the present invention describes a method and a device for controlling an hydraulic or pneumatic braking system. It is provided, in the process, that the braking system has at least one brake circuit, whose pressure is able to be increased or decreased using at least one electrically controllable pump motor. Furthermore, at least one electrically controllable valve is provided, such as in the form of a switchover valve, which may be used for pressure regulation in the brake circuit, and is moved to an open state when it is switched without current.

In order to achieve a specifiable, and thus reproducible final pressure in at least one part of the brake circuit, the pump is first controlled for pressure buildup or pressure drop with the valve closed. When a first predefined setpoint pressure is reached, or when a pressure threshold value is exceeded, the valve is put into an open position using a first actuation. According to the exemplary embodiments and/or exemplary methods of the present invention, after shutting off the pump, the control of the valve is modified in such a way that, during a specifiable time, a continuous change of the first actuation is undertaken all the way up to a second actuation, in which the valve takes on a holding position, particularly while taking into consideration the pressure difference present at the valve.

Because of such an actuation of the valve, a specifiable, and thus reproducible pressure is able to be set in the brake circuit of the braking system, independent of the slowing down of the pump after shutoff.

In one embodiment of the present invention, it is provided that the first actuation should take place using a starting current, and the second control using a hold current. The starting current may expediently be greater, in this instance, than the hold current, the reverse actuation being also possible.

In response to a (high) present pressure difference, the valve advantageously requires a lower current consumption than when no pressure difference, or only a small one, is present at the valve.

In order to determine the starting current and/or the specifiable time, in which, for instance, the starting current is brought continuously to the hold current, the slowing down of the pump is recorded after its shutoff. Thus one may conclude, for instance, what the required starting current should be and the required specifiable time, from one or more past pump cycles. In this context, typical variables which represent the slowing down of the pump are the rotary speed, the regenerative voltage and the time up to which the pump comes to rest without actuation.

In one refinement of the exemplary embodiments and/or exemplary methods of the present invention, the continuous change of the first actuation of the valve is undertaken in such a way on the second actuation that a second setpoint pressure is set in the brake circuit separated by the valve. The time in which the continuous change is undertaken is advantageously specified as a function of the second setpoint pressure, in this context.

In order to achieve the pressure in the brake circuit, it is provided in one embodiment of the present invention that one should close the valve by the second actuation or the hold current.

For the take-up of the pressure in the brake circuit, a pressure sensor or a model for estimating the pressure may optionally be used. Typical models use pump parameters, such as the rotary speed, the actuation and/or the slowing down voltage during the actuation, in order to estimate the volume conveyed. In addition, however, it is also possible to estimate the volume flow through the valve to obtain the pressure in the brake circuit.

Further advantages result from the following description of exemplary embodiments, and from the dependent patent claims.

DETAILED DESCRIPTION

Figure 1:
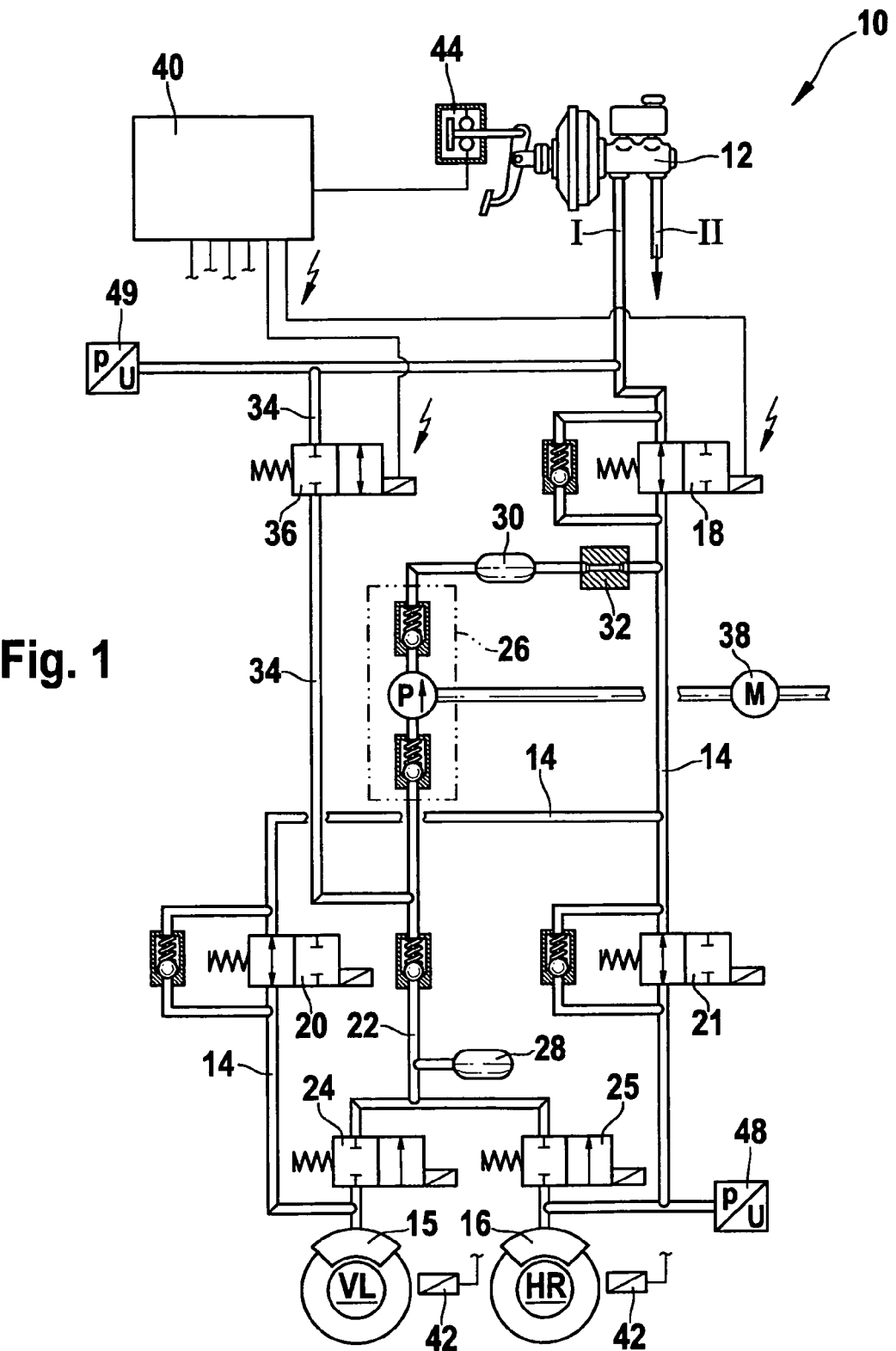
FIG. 1 schematically shows a brake circuit of a braking system in a block diagram.

FIG. 1 shows schematically a hydraulic vehicle braking system 10 having a dual-circuit brake master cylinder 12, to which two mutually independent brake circuits I and II are connected. To simplify things, however, Drawing 1 shows only brake circuit I, the other brake circuit II being correspondingly implemented. It should, however, be explicitly mentioned that correspondingly outfitted pneumatic vehicle brake systems are able to be operated using the method according to the present invention.

A branching main brake line 14 runs from brake master cylinder 12 to two wheel brakes 15 and 16 that are connected to brake circuit 1. In the present exemplary embodiment, the two wheel brakes 15 and 16 are assigned to a front wheel and a diagonally opposite rear wheel of the appertaining vehicle, brake circuit II being assigned to the other two wheels. However, besides this so-called X-braking apportioning, any other apportioning of the brake circuits is also conceivable.

In a common part of main brake line 14, a switchover valve 18 is situated between brake master cylinder 12 and pump 26. In addition, in the branched parts of main brake line 14 there are situated two inlet valves 20 and 21, that are open in their basic setting, which are respectively connected upstream of wheel brakes 15 and 16. A uniting return line 22, in which an outlet valve 24 and 25, that are closed in their basic setting, is provided for each of the two wheel brakes 15 and 16, leads from wheel brakes 15 and 16 to the suction side of a hydraulic pump 26, which may also be designated as a return pump. In addition, a hydraulic reservoir 28 is connected to return line 22, which is able to accommodate brake fluid from wheel brakes 15 and 16 in case the brake pressure is to be reduced, when pump 26 is switched off and outlet valves 24 and 25 are open. The pressure side of hydraulic pump 26 is optionally connected to main brake line 14 via a damping chamber 30 and a throttle 32 between switchover valve 18 and inlet valves 20 and 21. The suction side of hydraulic pump 26 is connected to a brake master cylinder 12 via a suction line 34, in which a suction valve 36 is situated that is closed in its basic setting. The pressure in brake master cylinder 12, which corresponds to the braking command of the driver by his operation of the brake pedal, is able to be picked up with the aid of an appropriate sensor 49.

Hydraulic pumps 26 of shown, and not shown brake circuits I and II, for instance, a 6-piston pump, are able to be driven using separate pump motors. However, in a further exemplary embodiment it is also possible to drive the pumps using a common electric pump motor 38. Switchover valve 18, inlet valves 20 and 21, outlet valves 24 and 25 and high-pressure switching valve 36 are provided in the present exemplary embodiment as solenoid valves which, among other things, are able to be controlled for lockup protection control and for traction control using an electronic control unit 40. This control unit 40 may also assume the control of pump motor 38, and it receives signals from wheel sensors 42 and possibly at least wheel pressure sensor 48, the sensors being able to be evaluated so as to establish the lockup tendency of a vehicle wheel during braking or the slip when driving off. In addition, control unit 40 receives a signal from an accelerator sensor (brake light switch) 44, using which the operation of brake master cylinder 12 is able to be established.

Figure 2:
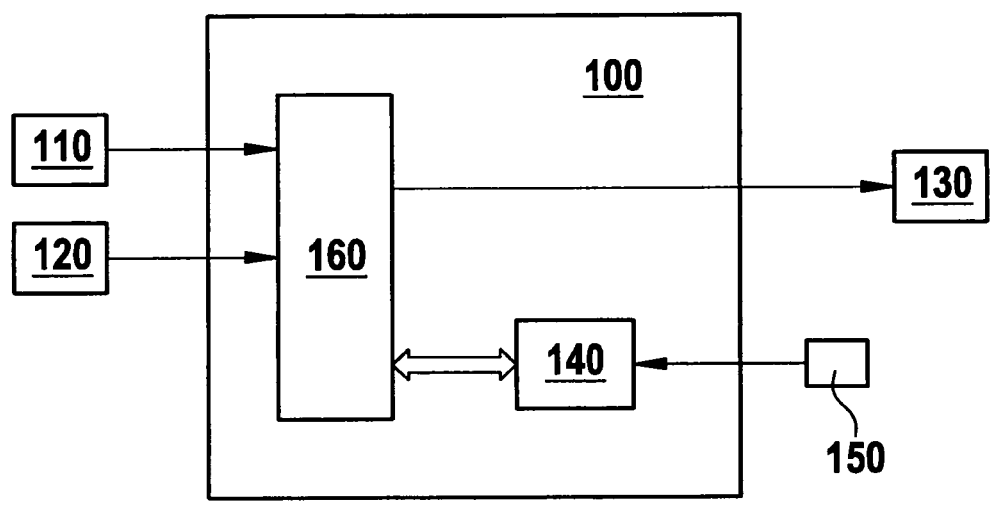
FIG. 2 shows a device according to the present invention.

FIG. 2 schematically shows a control device 100, having a control unit 160, for instance, a microprocessor, which supplies actuating signals to switchover valve 130 as a function of the operation of pump 110. Control device 100 is typically identical with control unit 40 in FIG. 1, but it may also be provided that control device 100 is developed separately, for instance, in a decentralized manner. Alternatively or in addition, control device 100 may also evaluate data on pressure response p(t) and volume flow Q(t) in the brake circuit, and take these into account in the actuation of switchover valve 130. Arrangement 120 may be provided for recording the pressure response and the volume flow, which supply the parameters required for this. For recording the pressure, a pressure sensor may be provided in the brake circuit, for instance, in this context, while using subtraction of various pressures in the braking system may be provided for ascertaining the volume flow. It should further be mentioned that the pressure or the pressure response in the brake circuit may also be concluded from the operating parameters of pump 110 and 26. The (pump-specific and valve-specific) parameters t* as well as $I_0$, $I_1$ and $I_2$ required for the actuation of switchover valve 130 may be stored in a memory 140. These parameters are able to be modified via an external interface 150.

Figure 3A:
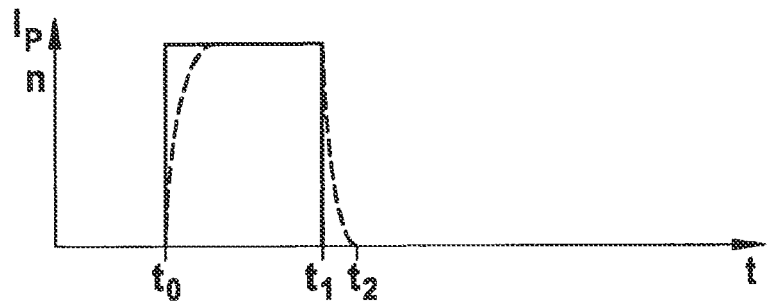
FIG. 3a shows a known valve actuation as a function of a corresponding pump actuation.
Figure 3B:
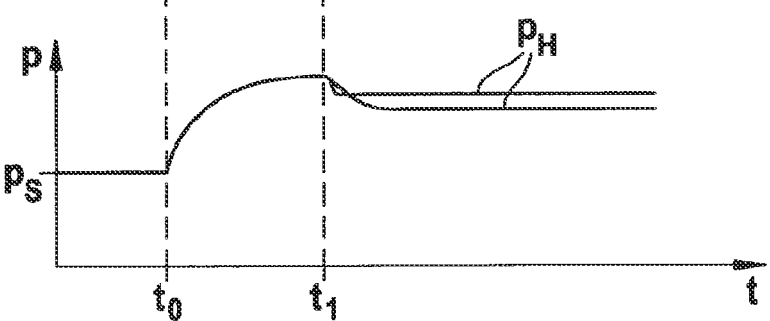
FIG. 3b shows a known valve actuation as a function of a corresponding pump actuation.
Figure 3C:
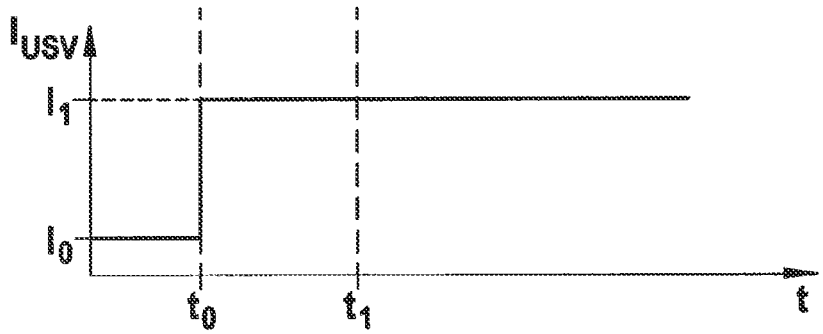
FIG. 3c shows a known valve actuation as a function of a corresponding pump actuation.
Figure 3D:
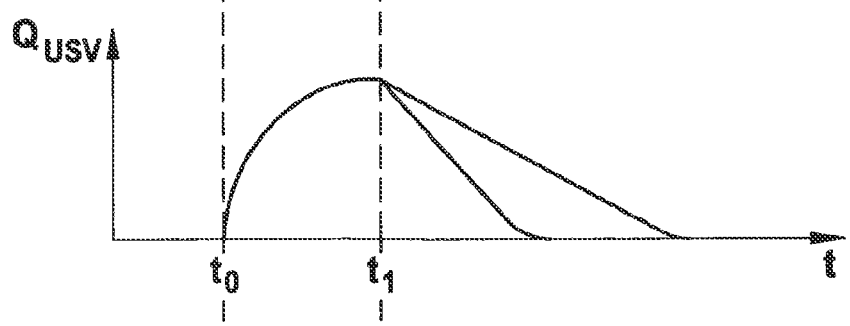
FIG. 3d shows a known valve actuation as a function of a corresponding pump actuation.
Figure 3E:
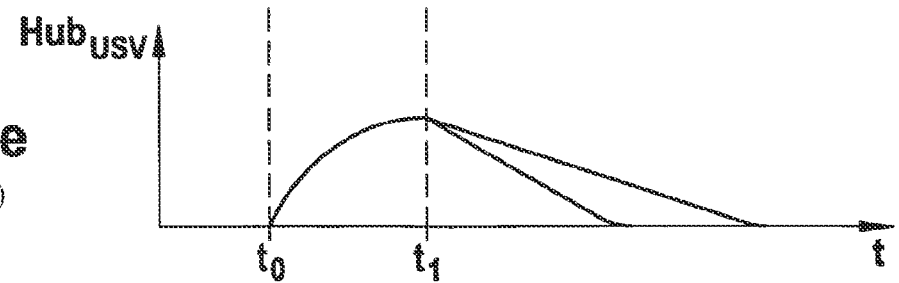
FIG. 3e shows a known valve actuation as a function of a corresponding pump actuation.

FIGS. 3a, 3b, 3c, 3d and 3e show the various actuation parameters or operating parameters of the braking system as a function of time, in response to a typical known actuation of a switchover valve 130. In FIG. 3a, actuating current $I_P$ and rotary speed n of pump 110 are shown, and in this instance, at time $t_0$ the pump is switched on, and at time $t_1$ it is switched off again. Because of a delay on account of inertia, speed n of the pump does not increase in a stepwise manner after it is switched on, but in a parallel shape, at first having a certain offset in time, up to the maximum speed. Correspondingly, the kinetic energy stored in the pump keeps the pump in motion after the switching off of the actuating current $I_P$ after time $t_1$, until the damping caused by the hydraulic medium damps the pump down to a standstill. During this slowing down of the pump a regenerative voltage is generated in the pump which may be acquired. FIG. 3b shows the pressure curve p(t) in the brake circuit, beginning with an initial pressure or starting pressure $p_S$. The pressure in the brake circuit rises parabolically, in this case, after the pump is switched on at time $t_0$, until it has reached the maximum pressure at time $t_1$. Actuation $I_{USV}$ of the switchover valve is shown in FIG. 3c. In this instance, the assumption is that the switchover valve is open in the current-free state.

In order to achieve a more rapid closing of the switchover valve, in one exemplary embodiment, the switchover valve has a slight current $I_0$ preapplied to it, while in another exemplary embodiment this preapplication of current may be omitted. At point $t_0$, the closed-loop control of the switchover valve is started, in which the valve is actuated using a current $I_1$. Because of this current $I_1$ ($>I_0$), the valve is put into a partially open state, so that the opening or the lift of the valve (see FIG. 3e) is a function of volume flow $Q_{USV}$ (see FIG. 3d) through the valve. As may be recognized in taking an overall view of FIGS. 3a to 3e, volume flow $Q_{USV}$ rises parabolically after the pump is switched on. By using a switchover valve which has an opening response that is a function of the pressure difference, a large volume flow $Q_{USV}$ holds the switchover valve open. Consequently, the lift of the switchover valve also increases parabolically up to point $t_1$, at which the pump is switched off. After the pump is switched off, the final achievable pressure or holding pressure $p_H$ depends, among other things, on the slowing down of the pump and on the opening response of switchover valve 18. Since neither time $t_2$ up to which the pump arrives at a standstill (pump slowing-down time), nor the transition of the valve from the partially open state (closed-loop control) to the closed state is reproducible because of the many boundary conditions (load, friction, rotary speed of the pump, temperature, volume flow via the switchover valve), a specified holding pressure $p_H$ cannot be set in the brake circuit.

Figure 4A:
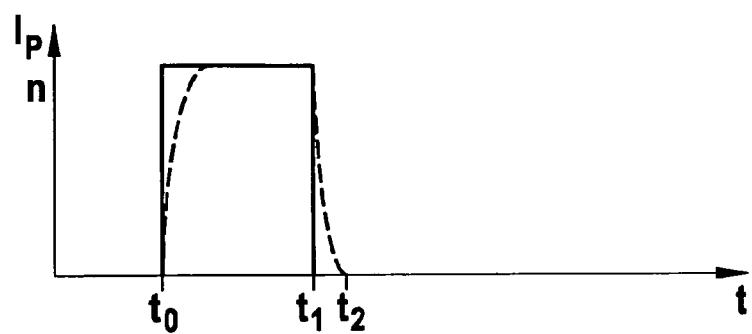
FIG. 4a shows the valve actuation according to the present invention, also as a function of the corresponding pump actuation.
Figure 4B:
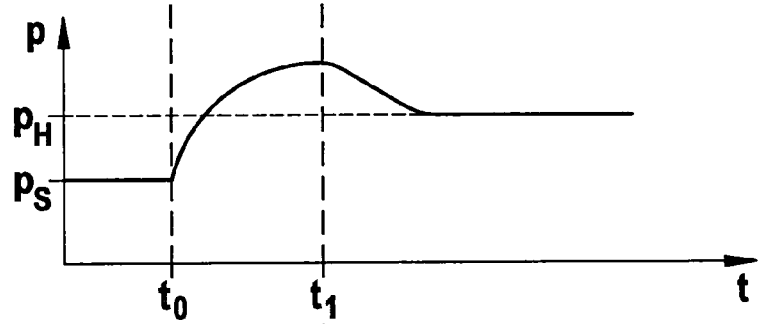
FIG. 4b shows the valve actuation according to the present invention, also as a function of the corresponding pump actuation.
Figure 4C:
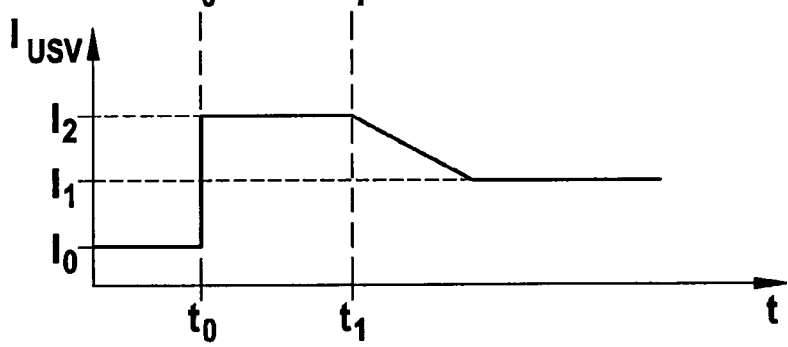
FIG. 4c shows the valve actuation according to the present invention, also as a function of the corresponding pump actuation.

Corresponding to the curves with respect to time in FIGS. 3a to 3e, in FIGS. 4a, 4b, 4c, 4d and 4e, the curves are shown that are in response to the method according to the present invention. The switching response of the pump in FIG. 4a, in this instance, corresponds to the switching response as shown in FIG. 3a. However, whereas the holding pressure is not definably specifiable in the current actuation of the switchover valve, FIG. 4b shows that, on account of the method according to the present invention, a reproducible final pressure $p_H$ is able to be achieved. Along with this, as is described in FIG. 4c, the switchover valve, upon the pump being switched on at time $t_0$, is actuated at first using a specifiable current $I_2$, which is greater than holding current $I_1$. After the pump is switched off, current $I_2$ is continuously brought down to holding current $I_1$, at which the switchover valve remains closed. It should be noted, in this context, that time $t^*$, in which the current is brought down, has to be greater than the slowing down of the pump, that is, $$t^* = \Delta(t_3 - t_1) > \Delta(t_2 - t_1).$$

Figure 4D:
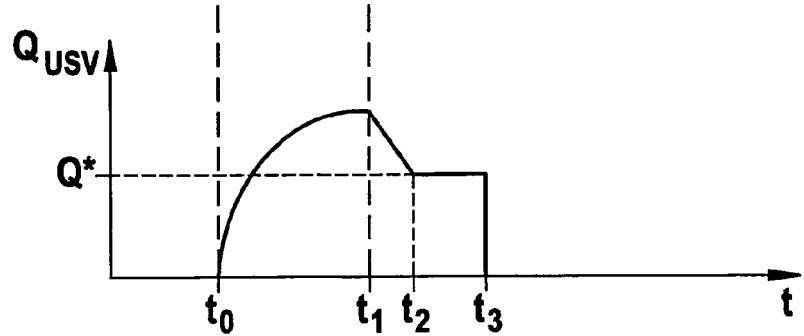
FIG. 4d shows the valve actuation according to the present invention, also as a function of the corresponding pump actuation.
Figure 4E:
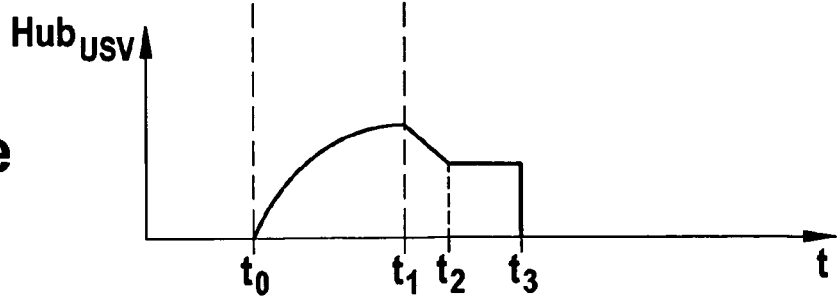
FIG. 4e shows the valve actuation according to the present invention, also as a function of the corresponding pump actuation.

In FIG. 4d it may thus be recognized that the slowing down response of the pump, first of all up to time $t_2$, determines volume flow $Q_{USV}$ and also lift$_{USV}$ of the switchover valve. Holding current $I_1$ is selected in such a way, in this instance, that the valve constantly remains open at least partially in response to a specified volume flow $Q^*$. The switchover valve closes only after an equalization of the pressure difference over the valve is achieved at time $t_3$, and thus the volume flow dies down.

By specifying the time $t^*$ at which current $I_2$ is brought down to holding current $I_1$, a specified holding current $p_H$ may thus be achieved in the brake circuit, or vice versa. On the other hand, the time of slowing down of the pump has no further influence on the setting of the holding pressure.

Time $t^*$ may be specified specifically for the pump, based on values from experience for the slowing down phase of the pump used, and stored in a memory 140. It is advantageous, in this context, if this value is able to be implemented or overwritten when pump 110 is exchanged by a service technologist 150. A further possibility in the ascertainment and the specification of time $t^*$ is that, during the operation of the braking system, continuous data on the slowing down phase of the pump are collected and stored in memory 140. From these data, for example, using weighted average formation, one may conclude what the currently required time $\Delta(t_2-t_1)$ is for the slowing down phase of the pump. By the addition of a buffer time for this required time, time $t^*$ is then able to be determined.

In one additional specific embodiment it is provided that the switchover valve be opened and thus overflowed, after the switching on of the pump, and when a certain setpoint pressure ($p_S$+x) is achieved. Because of the volume flow required for the pressure equalization, the switchover valve subsequently remains open until the pump is shut down. Because of the pressure equalization in the brake circuit, and because of the specified lowering of actuating current $I_{USV}$, at the switchover valve from $I_2$ to $I_1$, the switchover valve is slowly closed. Actuating current $I_1$ secures the closed state of the switchover valve.

What is claimed is:

1. A method for controlling a braking system, the method comprising:
   electrically actuating one pump motor for one of a pressure buildup and a pressure reduction in a brake circuit of the braking system, wherein the pump is actuated during a period of time in which a valve for pressure regulation in the brake circuit is closed;
   putting the closed valve into an open position using a first actuation upon achieving a pressure threshold value which represents a first setpoint pressure in the system; and
   putting the valve, after a switching off of the pump, into a holding position using a second actuation, wherein the first actuation is brought continuously to the second actuation in a specifiable time.

2. The method of claim 1, wherein the first actuation is provided using a starting current and the second actuation is provided using a holding current, and wherein the starting current is greater than the holding current.

3. The method of claim 1, wherein:
   a slowing down of the pump is recorded after the pump is switched off;
   at least one of the starting current and the specifiable time is specifiable as a function of the slowing down of the pump after the pump is switched off; and
   at least one of the following is satisfied:
   (i) for the recording of the slowing down of the pump, at least one of the rotary speed and the regenerative voltage are recorded, and
   (ii) the slowing down is derived from prior pressure buildup cycles and prior pressure reduction cycles.

4. The method of claim 1, wherein a second setpoint pressure settable in the brake circuit by a continuous change of the first actuation to the second actuation, and wherein the specifiable time is specified as a function of the second setpoint pressure.

5. The method of claim 1, wherein the holding position represents a closing position of the valve.

6. The method of claim 1, wherein the first setpoint pressure in the brake circuit is recorded one of (i) by a pressure sensor, and (ii) as a function of at least one of a volume flow through the valve and of the actuation of the pump.

* * * * *

UNITED STATES PATENT AND TRADEMARK OFFICE
CERTIFICATE OF CORRECTION

PATENT NO.        : 8,585,157 B2  
APPLICATION NO. : 12/086669  
DATED             : November 19, 2013  
INVENTOR(S)       : Grell et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1557 days.

Signed and Sealed this
Twenty-second Day of September, 2015

Michelle K. Lee  
*Director of the United States Patent and Trademark Office*